United States Patent [19]

Chamberlain

[11] Patent Number: 5,528,885
[45] Date of Patent: Jun. 25, 1996

[54] FOOTWEAR FOR HOOVED ANIMALS

[76] Inventor: Sally B. Chamberlain, 2503 Long Ridge Rd., Stamford, Conn. 06903-1604

[21] Appl. No.: 339,460

[22] Filed: Nov. 14, 1994

[51] Int. Cl.$^6$ ................................................ B68C 5/00
[52] U.S. Cl. ........................................................ 54/82
[58] Field of Search .............................. 54/82; 168/1, 2, 168/3, 18

[56] References Cited

U.S. PATENT DOCUMENTS

| | | | |
|---|---|---|---|
| D. 26,832 | 3/1897 | Hirsch | 54/82 X |
| 65,231 | 5/1867 | Jennings | 54/82 X |
| 167,895 | 9/1875 | Hall | 168/2 |
| 617,153 | 1/1899 | Galpin | 54/82 X |
| 1,039,002 | 9/1912 | Winston | 168/18 |
| 3,209,726 | 10/1965 | Fisher . | |
| 4,736,800 | 4/1988 | Rohner | 168/18 |
| 4,981,010 | 1/1991 | Orza et al. | 54/82 |
| 5,148,657 | 9/1992 | Stafford | 54/82 |
| 5,224,549 | 7/1993 | Lightner | 168/18 |

Primary Examiner—Robert P. Swiatek
Attorney, Agent, or Firm—Saltbox Patent Law Services

[57] ABSTRACT

Footwear for a hoofed animal including a sole member, a flexible sleeve extending upwardly from the sole member, a material positioned substantially around the outer surface of said sleeve and having substantially abutting edges containing an enclosure to secure the footwear to the leg of the animal.

12 Claims, 2 Drawing Sheets

FOOTWEAR FOR HOOVED ANIMALS

BACKGROUND OF THE INVENTION

1. U.S. Pat. No. 5,224,549 discloses footwear for hooved animals, especially horses, wherein a sole has attached thereto a sleeve means. The sleeve means extends only part way around the circumference of the sole and cooperatively with a second sleeve. The two sleeves are positioned in overlapping relationship whereby the second sleeve has elongated sections which retain the footwear on the animal by engaging the first sleeve.

2. U.S. Pat. No. 4,981,010 discloses a horse boot having a flexible, molded enclosure adapted to fit around a specific horse's hoof. The enclosure contains a slit running downwardly to the sole. It is a one boot for one horse invention.

3. U.S. Pat. No. 4,736,800 discloses footwear for hooved animals wherein the rear wall thereof has its upper edge below the region of the rudimentary toes. Straps are positioned in the fetlock section of the footwear to retain the footwear on the animal.

4. U.S. Pat. No. 5,148,657 discloses a dog boot having a tongue but which is secured with a strap which is secured to the boot at vertically-spaced locations.

5. U.S. Pat. No. 3,209,726 discloses animal shoes of one-piece configuration having a tongue and lacing which is made of leather or plastic but is not overlapped at its lower edges.

All of the above patents disclose footwear for animals which suffer from deficiencies which are overcome by the footwear of the present invention. Thus, the '549 patent contains securing means which enables foreign matter to enter through the front thereof during use because the sleeves overlap. The boot of the '010 patent contains a slit in-its side which when in use enables dirt, water etc. to enter the boot thus contaminating bandages etc. which may be worn by the animal. The footwear of the '800 patent being low at its rear edge, see FIG. 5, also enables contaminating debris to enter the footwear during use whereas the boot of the '657 patent is adapted primarily for a dog and does not possess the integrity and strength necessary for use on a hooved animal such as a horse. Lastly, the '726 patent is also primarily adapted for use on a pawed animal such as a dog and its lacing configuration clearly allows debris to enter the shoe.

OBJECTS OF THE INVENTION

The instant invention has as its objects:

1. To protect hoof and dressings/bandages after hoof wall resections or other surgeries due to laminitis etc.
2. To temporarily protect the hoof after losing a shoe.
3. To temporarily replace conventional shoes where the hoof wall is not sufficient to hold shoe nails.
4. To provide protection to horses which are usually unshod and used only occasionally.
5. To provide protection to horses from damage due to pawing, kicking, banging etc. in the stall or horse trailer.

DESCRIPTION OF THE INVENTION

The present invention relates to footwear for hooved animals for covering and protecting the animal's hoof and lower leg. The footwear comprises an element having front and rear sections including:

a) a sole portion comprising a first foam member having an inner and outer surface;

b) an upstanding portion, in the form of a flexible sleeve, extending upwardly from the sole portion along the entire circumference thereof and comprising a second foam member having an outer surface;

said sole portion having an insole positioned on the inner surface thereof and an abrasion-resistant, friction enhancing layer on the outer surface thereof;

said upstanding portion having A) a material positioned at least around substantially the entire outer surface thereof and ending in substantially abutting edges at said front position and B) at least one slit positioned under said material in the area thereof beneath, and preferably rearward of, said edges and c) enclosure means cooperatively attached to said edges to secure the footwear around the hoof and leg of the animal.

The footwear of the present invention is relatively simple and easy to construct and may be easily fit to the leg of an animal, especially a horse. The footwear is especially adapted to be used in instances where the animal suffers from hoof and/or leg problems which may necessitate bandaging. The footwear enables the bandaged animal to be mobile while recovering from its maladies and protects the bandaging from becoming contaminated by debris such as dirt, stones, water, stable artifacts and the like. The footwear of the present invention is also tight-fitting and is not easily removed by the animal in use such as by trotting, cantering, galloping etc. as are some previously and currently available appliances.

The footwear of this invention includes a sole member having an inner and outer surface and an upstanding portion extending upwardly from the sole member around the entire periphery thereof to thereby define a flexible sleeve having an interior for receiving the hoof and lower leg of an animal. The sole member and upstanding portion are integral and rigidly constructed whereby the front of the element generally conforms to the shape of the front surface of a horse's hoof. The sole member likewise generally conforms in shape to that of the bottom surface of a horse's hoof.

The upstanding portion extends upwardly from the periphery of the sole member forming a circular open area of a size generally in conformity with the circumference of a horse's leg. The upstanding portion engages the horse's leg at least up to and preferably above the coronary band. Both the sole member and upstanding portion are formed of flexible material which enables the horse to easily flex its leg.

The footwear is secured to the horse by virtue of a layer of material applied to the outer surface of the upstanding portion which material ends in the front of the the footwear as substantially abutting edges containing securing means to retain the footwear on the animal.

The upstanding portion has at least one (1) and preferably two (2) slits positioned at least substantially directly behind and beneath the edges of the material and preferably rearward of the abutting edges, so as to enable the footwear to be opened wider at its upper circumference thereby enabling easy entrance of the animal's hoof and leg.

Figure 1:
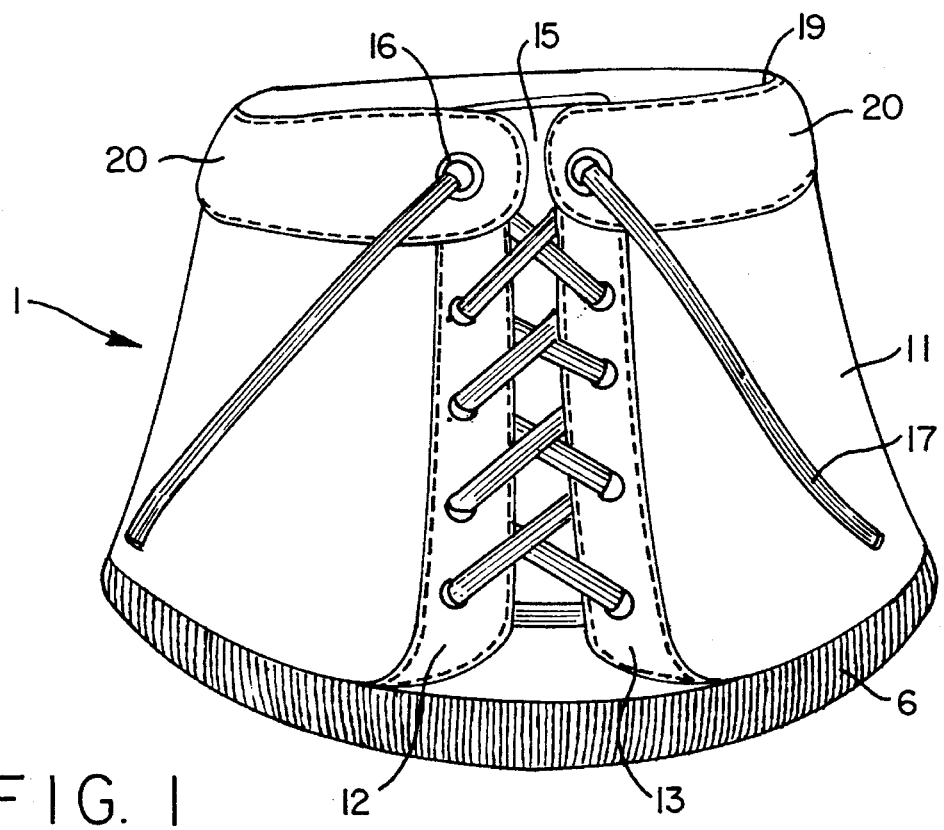
FIG. 1 is a front view of animal footwear constructed in accordance with the present invention.
Figure 3:
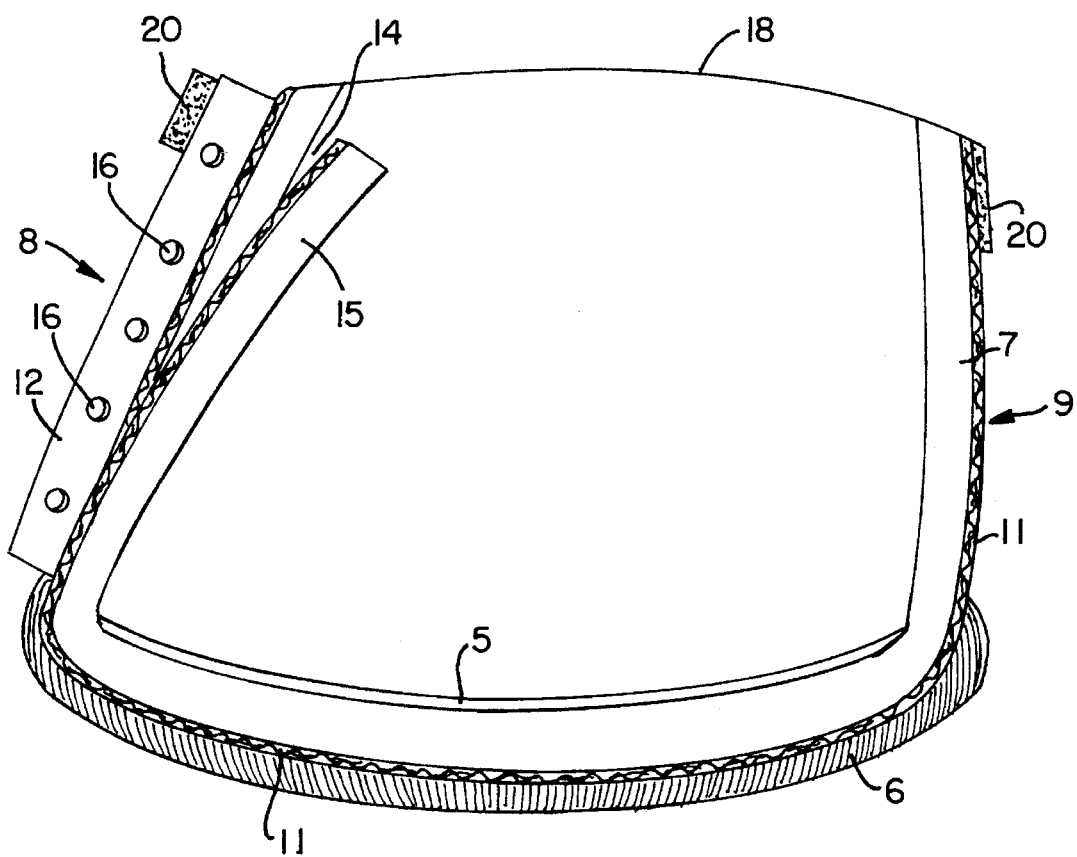

FIG. 3 is a cross-sectional view of the footwear of FIG. 1 taken along an imaginary line extending from the front to the rear thereof.

FURTHER DESCRIPTION OF THE INVENTION INCLUDING PREFERRED EMBODIMENTS AND BEST MODE FEATURES

Figure 2:
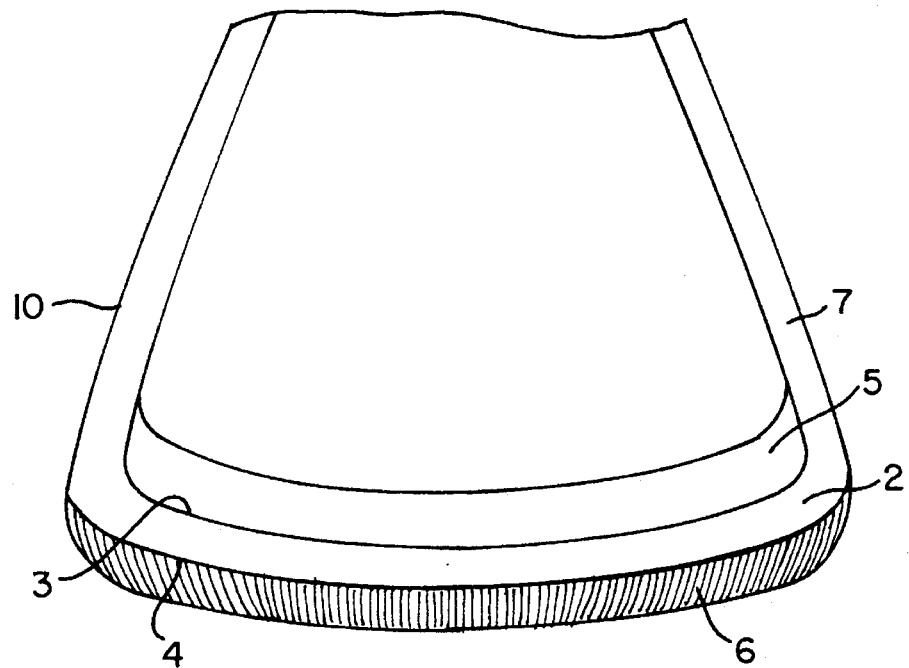
FIG. 2 is a cross-sectional view of the sole and lower section of the upstanding portion of the footwear of FIG. 1 taken along an imaginary line drawn from side to side thereof.

Referring to the drawings, footwear constructed in accordance with the present invention is generally designated in FIG. 1 by numeral 1. The footwear includes sole portion or member 2, best seen in FIGS. 2 and 3. Sole portion 2 is of relatively rigid construction and is preferably formed of a foam material. Sole portion 2 includes inner surface 3 and outer surface 4. Sole portion 2 has positioned on its inner surface 3 an insole 5 which is constructed of a material conducive to the comfort of the animal e.g. a horse, especially if the hoof of the animal is diseased, deteriorated etc. or undergoing healing. Suitable materials of which the insole is made include soft leather, rubber and the like which can undergo abuse without being easily destroyed such as by a metal horseshoe or animal hoof. The insole is generally from about 1/32 to about 1/4 of an inch in thickness and is preferably adhered to the inner surface of sole portion 2 by use of a suitable, preferably non-toxic, adhesive.

Positioned on the outer surface 4 of sole portion 2 is an abrasion-resistant, friction enhancing layer 6 which provides wear resistance to the bottom of the foot-wear and enables the animal to traverse terrain more easily and protects the footwear from water, snow etc. Preferred materials for layer 6 include Plastic Dip (R), a flexible, synthetic rubber which may be coated onto surface 4 from solution and is sold by PDI Inc., 3760 Flower-field Road, Circle Pines, Minn. 55014. Other air drying, synthetic rubber, coatable materials which can be dipped, sprayed, brushed or otherwise applied to outer surface 4 may be used. Coating 6 may range in thickness from about 1/32 inch to about 1/4 inch, preferably about 1/8 inch. Alternatively, layer 6 may be preformed, such as by casting, heat and/or pressure application or by molding etc. into the desired thickness and shape and then adhered to layer 4 with a suitable adhesive or the like.

Rising from the outer periphery of sole portion 2 around its entire curcumference is upstanding portion 7 which is preferably constructed of the same material as sole portion 2 but may be different. Examples of useful materials include foams such as open-foams and closed-foams of natural or synthetic substances. The preferred material of which both the sole portion 2 and the upstanding portion 7 are constructed is a closed-cell foam of polyurethane, polyethylene, neoprene etc. including the type usually used in underwater search and rescue etc. garments.

Upstanding portion 7 is positioned, in relation to sole portion 2, via any suitable means such as by application of an adhesive, thereby bonding the two members together. Alternatively, the upstanding portion 7 and sole portion 2 may be formed from a single sheet of material by the application of heat etc. thereby molding the sheet to the desired shape. Additionally, a foamable material may be poured into a suitable mold and formed into the desired shape during foaming as is known in the art. The thickness of the upstanding portion 7 and sole portion 2 may be the same or different and should range from about 1/4 inch to 3/4 inch and most preferably about 1/2 inch. The lower circumference of the upstanding portion 7 conforms to that of the sole portion 2 whereas the upper circumference thereof conforms to about the size of the leg of the animal which is to use the footwear. Since the upper circumference is smaller, the front of the footwear tapers inwardly toward the back in general conformity to the natural slope of the front of the hoof of the animal. The height of the front 8 of the footwear of the present invention is preferably sufficient to cover and extend beyond the coronary band whereas the height of the back 9 of the footwear is below the fetlock of the animal but also above the coronary band. The entire footwear preferably covers a substantial portion of the pastern completely around the leg. Front 8 preferably is positioned slightly higher on the animal's leg than rear 9 when the footwear is in use.

Substantially completely surrounding the upstanding portion 7 and in superimposed relationship therewith is a material layer 11 which conforms in size and shape to the outer surface 10 thereof and is preferably a textile material such as canvas, although leather, plastic or other materials can also be used, alone or together. Material layer 11 begins and ends at the front 8 of the footwear as two, substantially abutting edges, i.e. left edge 12 and right edge 13. Material 11 may be adhesively bonded or otherwise adhered to the outer surface 10 of upstanding portion 7 such as by heat and pressure consolidation, applied, for example, during or after the manufacture of the material from which upstanding portion 7 is made. Alternatively, material layer 11 may be independently positioned in detached fashion over upstanding portion 7.

In a preferred embodiment, material layer 7 continues around and under sole portion 2 being positioned between outer surface 4 and layer 6. This configuration imparts more strength and integrity to the footwear by providing additional support for sole portion 2.

The front of upstanding portion 2 contains at least one and preferably a pair of slits 14, best seen in FIG. 3. The slit or slits are positioned at least beneath edge 12 or 13, and preferably, when two slits are fashioned, are rearwardly of each of edges 12 and 13, so as to form a tongue 15 which may be folded forward to allow easy access to the animal's hoof and leg. Slit 14 runs from the top of portion 2 and may extend at least halfway down the height of portion 7 and preferably terminates as stress relief openings, not shown. Preferably, when two slits are present, they are substantially parallel.

Edges 12 and 13 are provided with suitable enclosure means cooperatively attached thereto so as to enable one to secure the footwear to the animal via tension on the material layer 11 or the upstanding portion 7 or both. Preferably, as is shown in FIG. 1, the enclosure means entails a series of substantially parallel holes 16 in each of edges 12 and 13 which enables the tension to be applied via lacing 17. Holes 16 may be reinforced via stitching, grommets etc to prevent wear. Additionally, material layer 11, of which edges 12 and 13 are constructed, may be folded over and stitched to form a double or triple etc. layered area, thereby providing even more durability to the footwear.

If desired, material from which material layer 11 is composed may also be applied to the outer side of tongue 15 for aesthetic purposes. Layer 6 may preferably extend beyond the outer surface of the sole portion and upwards onto the bottom edge of material layer 11 as shown best in FIG. 1, to provide protection to the edges of the footwear.

The top edge 18 of upstanding portion 7 and the top rim 19 of material layer 11 terminate coextensively. Top rim 19 may be folded over and stitched to form a band 20 as shown in FIG. 1. Top edge 18 and/or top rim 19 may be treated, such as by coating, to provide a protective surface to the uppermost area of the footwear such as with the same material used to form layer 6.

Layer 6 may be further enhanced by providing thereto a slippage reducing configuration such as downwardly projecting cleats, sawtooth shaped slits or a waffle-type tread, not shown, or by adding traction materials such as carbide etc.

Other features such as the use of a stretchable material for material layer 11 will become apparent to those skilled in the art after reading the above description.

The footwear of the instant invention may be used with or without the traditional iron horseshoe but is primarily adapted to be used without. It provides protection to injured or healing horses by preventing contact of bandaged or unbandaged hooves with the ground. It is relatively light weight, durable and does not cause friction burn, blisters or tenderness to sensitive hoof areas. It is very easily cleaned such as by thorough hosing inside and out and may be easily dried such as in a clothes dryer or even outside in the sun.

I claim:

1. Footwear for a hooved animal for covering and protecting the hoof and lower leg comprising an element having front and rear sections including:
    a) a sole portion comprising a first foam member having an inner surface and outer surface;
    b) an upstanding portion extending upwardly from the sole portion along the entire circumference thereof and comprising a second foam member having an outer surface; said sole portion having an insole positioned on the inner surface thereof and an abrasion-resistant, friction enhancing layer on the outer surface thereof; said upstanding portion having A) a material positioned around substantially the entire outer surface thereof and ending in substantially abutting left and right edges at said front section, and B) at least one slit positioned under said material and
    c) enclosure means cooperatively attached to said edges to secure the footwear around the hoof and leg of the animal.

2. Footwear according to claim 1 wherein said first and second foam members are a closed-cell foam.

3. Footwear according to claim 1 wherein said upstanding portion is adhesively adhered to said sole portion.

4. Footwear according to claim 1 wherein said insole is rubber.

5. Footwear according to claim 1 wherein said layer is rubber.

6. Footwear according to claim 1 wherein said material is a textile.

7. Footwear according to claim 6 wherein said textile is canvas.

8. Footwear according to claim 1 wherein said at least one slit extends at least halfway down the height of said upstanding portion.

9. Footwear according to claim 1 wherein said enclosure means comprises a series of substantially parallel holes in the edges of said material and a lace.

10. Footwear according to claim 9 wherein said edges are folded and stitched to form a double layer.

11. Footwear according to claim 1 wherein said material is folded and stitched at its upper periphery.

12. Footwear according to claim 1 wherein said coating has a tread pattern embossed in the exterior surface thereof.

* * * * *